United States Patent [19]

Amata

[11] Patent Number: 4,736,634

[45] Date of Patent: Apr. 12, 1988

[54] MAGNETIC FIELD GENERATING DEVICE FOR ELECTROMAGNETIC FLOWMETER OF RESIDUAL MAGNETIZATION TYPE

[75] Inventor: Yoshitaka Amata, Yokkaichi, Japan

[73] Assignee: Aichi Tokei Denki Co., Ltd., Japan

[21] Appl. No.: 942,115

[22] Filed: Dec. 16, 1986

[30] Foreign Application Priority Data

Dec. 27, 1985 [JP] Japan .................................. 60-299334

[51] Int. Cl.$^4$ .................................................. G01F 1/58
[52] U.S. Cl. .................................................. 73/861.12
[58] Field of Search ............ 73/861.12, 861.13, 861.17

[56] References Cited

U.S. PATENT DOCUMENTS 4,409,846 10/1983 Ueno ................................ 73/861.17
4,601,209 7/1986 Amata ............................. 73/861.17

Primary Examiner—Charles A. Ruehl
Attorney, Agent, or Firm—Pollock, Vande Sande & Priddy

[57] ABSTRACT

A magnetic field generating device for an electromagnetic flowmeter of the residual magnetization type which comprises a pair of first yokes having one of their end faces disposed opposite to each other on both sides of a magnetic gap including a fluid conduit of a non-magnetic material, a core disposed between the other end faces of the first yokes, a coil wound around the core, and at least one second yoke in direct contact with at least one of the first yokes and in direct contact with the associated end face of the core. The second yokes are made of a magnetic material having low electrical conductivity and high permeability. The core has an axial length shorter than that of the coil.

4 Claims, 3 Drawing Sheets

MAGNETIC FIELD GENERATING DEVICE FOR ELECTROMAGNETIC FLOWMETER OF RESIDUAL MAGNETIZATION TYPE

BACKGROUND OF THE INVENTION

This invention relates to improvements in a magnetic field generating device for an electromagnetic flowmeter of residual magnetization type.

U.S. Pat. No. 4,409,846 discloses an electromagnetic flowmeter of residual magnetization type in which a semi-hard magnetic material which has a high permeability, which is easily magnetized and which has a coersive force of a relatively large value is used in its magnetic circuit.

Another electromagnetic flowmeter of residual magnetization type is also known in which its magnetic circuit includes magnetic materials providing a coersive part and a soft magnetic part as shown in FIG. 1.

The known electromagnetic flowmeter shown in FIG. 1 includes a pair of yokes 2 and 3 having their end faces disposed opposite to a fluid conduit 1 made of a non-magnetic material, and a core 4 disposed in magnetically series relation with the yokes 2 and 3. The core 4 is made of a magnetically semi-hard material so as to act as the coersive part described above, and the cores 2 and 3 are made of a magnetically soft material so as to act as the soft magnetic part described above. In the electromagnetic flowmeter shown in FIG. 1, its magnetic circuit is composed by the core 4, the yoke pair 2 and 3 and a magnetic gap including the fluid conduit 1, and a coil 5 is wound around the core 4. In order to magnetize the core 4 made of the semi-hard magnetic material, a pulse current having a short pulse width is periodically supplied to the coil 5 for a short period of time. The direction of this pulse current is alternately reversed. When the pulse current is supplied to the coil 5 in one direction, the core 4 is magnetized in a direction corresponding to the direction of the pulse current, and, when the pulse current disappears, a magnetic flux is applied across the fluid conduit 1 by the residual magnetization of the core 4. An electromotive force is generated according to the strength of the magnetic flux and the velocity of a fluid flowing through the fluid conduit 1 in a direction orthogonal with respect to the drawing sheet in FIG. 1. The electromagnetic force is derived from a pair of electrodes 6 and 7 and is sampled in an external electronic circuit (not shown) to measure the flow rate of the fluid. Since the direction of the pulse current supplied to the coil 5 is alternately reversed, the direction of the magnetic flux produced by the residual magnetization is also alternately reversed, and the direction of the electromotive force derived from the electrodes 7 and 8 is also alternately reversed.

In order to decrease the energy supplied to the coil 5 in the electromagnetic flowmeter of residual magnetization type shown in FIG. 1, that is, in order to decrease the power consumption, it is necessary to effectively utilize the residual magnetization of the core 4 of the semi-hard magnetic material disposed in the magnetic circuit. This is attained by determining the operating point of the magnetic circuit so that the operating point is set at a position where the magnetic energy product $(B \times H)$ in the B-H curve of the core 4 is maximum. In order that the operating point of the magnetic circuit in the electromagnetic flowmeter of residual magnetization type shown in FIG. 1 can be set at the point where the magnetic energy product $(B \times H)$ is maximum, the circuit constants of the magnetic circuit should be changed so that the operating point can be located at the desired position. This is attained by one of the following three methods:

(a) The magnetic gap between the yokes 2 and 3 is changed thereby changing the magnetic reluctance.
(b) The sectional area of the core 4 is changed.
(c) The axial length of the core 4 is changed.

However, the method described in (a) is impractical. This is because the diameter of the fluid conduit 1 cannot be decreased since the flow rate to be measured is fixed. Also, the increase in the magnetic gap undesirably results in an increased energy loss. Furthermore, it becomes undesirably necessary to change the dimension of the yokes 2 and 3. According to the method described in (b), an additional cost is required for changing the sectional area of the core 4. In addition, changing the sectional area of the core 4 requires changing the size of the coil 5 to meet the changed diameter of the core 4. Thus, the method described in (b) is costly and troublesome. According to the method described in (c), it is necessary to change the dimensions of the L-shaped yokes 2 and 3 to meet the changed length of the core 4, and it is also necessary to change the axial length lm of the coil 5 to meet the changed axial length of the core 4. Thus, the method described in (c) is costly and troublesome.

SUMMARY OF THE INVENTION

With a view to solve the prior art problems pointed out above, it is an object of the present invention to provide a magnetic field generating device for an electromagnetic flowmeter of residual magnetization type, in which the operating point of the magnetic circuit can be easily adjusted, so that the operating point can be set at the position where the magnetic energy product is maximum on the B-H curve of the core.

Another object of the present invention is to provide a magnetic field generating device of the kind described above which can minimize the power required for magnetizing the core.

In accordance with the present invention, there is provided a magnetic field generating device for an electromagnetic flowmeter of residual magnetization type comprising a pair of first yokes having one of their end faces disposed opposite to each other on both sides of a magnetic gap including a fluid conduit made of a non-magnetic material, a core disposed between the other end faces of the first yokes, a coil wound around the core, and a pair of second yokes disposed so as to make direct contact with the first yokes respectively and to make direct contact with the associated end faces of the core respectively, the second yokes being made of a magnetic material having a low electrical conductivity and a high permeability, the core having an axial length ln shorter than that lm of the coil.

The axial length of the core is determined depending on the magnetic properties of the semi-hard magnetic material forming the core, and this length of the core is adjusted so that the operating point of the magnetic circuit is located at the position where the magnetic energy product is maximum on the B-H curve of the core. The second yokes are shifted or slided in their axial direction respectively depending on the length of the core until their inner end faces make direct contact with the associated end faces of the core respectively.

The axial length ln of the core is shorter than that lm of the coil. Therefore, it is unnecessary to change the size of the coil since the coil is disposed radially outside the connections between the core and the second yokes in the magnetic circuit.

The second yokes are made of the magnetic material having the low electrical conductivity. Therefore, an eddy current induced in the second yokes when the pulse current is supplied to the coil can be suppressed to a minimum. Accordingly, the strength of the magnetic field generated by the pulse current supplied to the coil can be increased in a short period of time, and the energy supplied can be correspondingly effectively utilized.

DESCRIPTION OF THE PREFERRED EMBODIMENT

Figure 1:
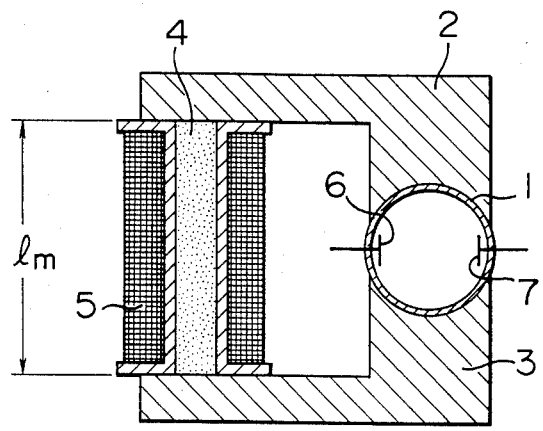
FIG. 1 shows schematically the structure of a prior art electromagnetic flowmeter of residual magnetization type.
Figure 2:
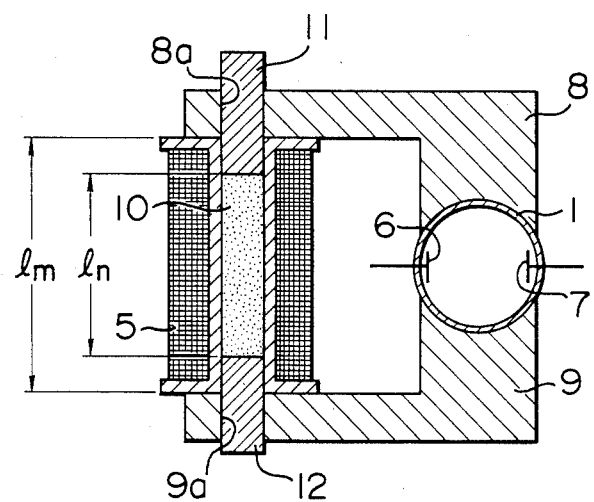
FIG. 2 shows schematically the structure of an embodiment of the electromagnetic flowmeter of residual magnetization type according to the present invention.
Figure 3:
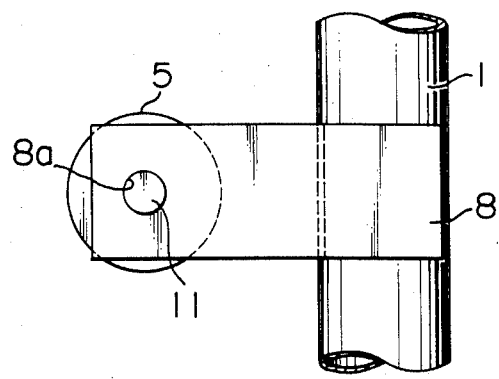
FIG. 3 is a plan view of the embodiment shown in FIG. 2.

In FIGS. 2 and 3, like reference numerals are used to designate like parts appearing in FIG. 1.

Referring to FIGS. 2 and 3, a pair of electrodes 6 and 7 are disposed in a fluid conduit 1. A pair of first yokes 8 and 9 made of a soft magnetic material have one of their end faces disposed opposite to the outer periphery of the fluid conduit 1. A pair of second yokes 11 and 12 made of a magnetic material having a high permeability and a low electrical conductivity are disposed between the first yokes 8, 9 and a core 10 of a semi-hard magnetic material respectively in a relation magnetically series with the first yokes 8, 9 and core 10. The core 10 and the second yokes 11, 12 are in the form of coaxially aligned solid cylinders having the same diameter, and a coil 5 is wound around the core 10 and associated portions of the second yokes 11 and 12. The second yokes 11 and 12 are snugly but axially slidably inserted in circular holes 8a and 9a formed in the first yokes 8 and 9 respectively. The axial length ln of the core 10 is selected to be shorter than that lm of the coil 5, and the second yokes 11 and 12 make direct contact at their axially inner end faces with the associated end faces of the core 10 respectively. The axial length ln of the core 10 is determined so that the operating point of the magnetic circuit is set at the position where the magnetic energy product (B×H) is maximum on the B-H curve of the core 10. How to determine this length ln will be described with reference to FIG. 4. The loop shown in FIG. 4 represents the B-H curve determined by the magnetic properties of the material of the core 10, and, at positions $P_1$ and $P_2$ corresponding to the points having largest curvatures in the B-H curve, the magnetic energy product (B×H) becomes maximum.

Figure 4:
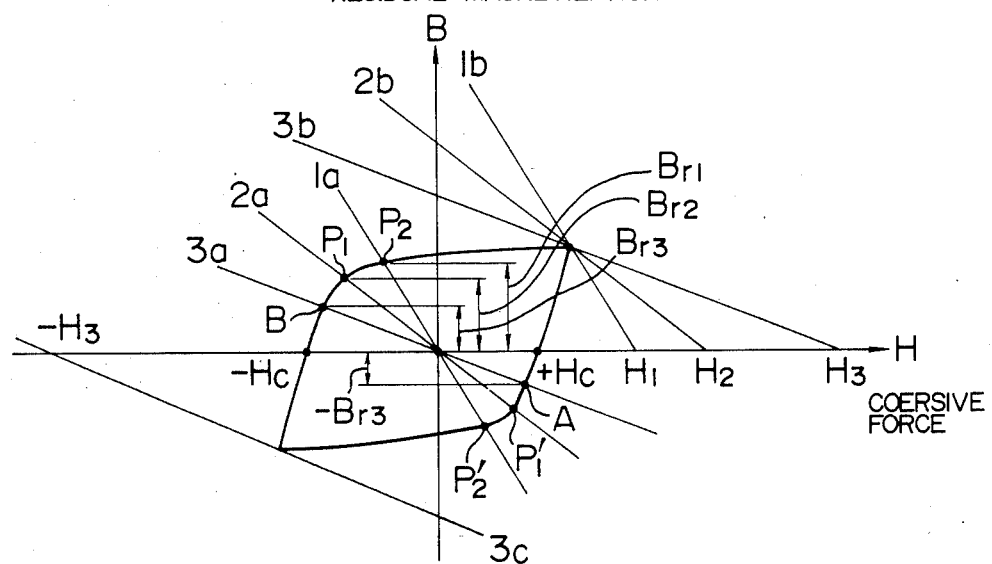
FIG. 4 is a graph showing the relation between the coersive force and the residual magnetization.

Straight lines 1a, 2a and 3a in FIG. 4 represent operating lines having gradients determined by the circuit constants including the diameter of the fluid conduit 1 which is part of the magnetic gap of the magnetic circuit and the length and sectional area of the core 10. These lines 1a, 2a and 3a represent the operating lines in a state in which no pulse current is supplied to the coil 5.

Suppose now that the line 3a in FIG. 4 represents the operating line determined by the circuit constants of the magnetic circuit. When a pulse current is supplied to the coil 5 to generate a magnetic field $-H_3$ for a short period of time thereby magnetizing the core 10 in a negative direction as shown by a line 3c, and the supply of the pulse current is then interrupted, the residual magnetization of the core 10 causes flow of a magnetic flux across the magnetic gap including the fluid conduit 1. In this case, the operating point of the magnetic circuit is given by a point A where the straight line 3a parallel to a straight line 3b intersects the loop of the B-H curve, and the residual magnetization of the core 10 is given by $-B_{r3}$. Thus, the magnetic flux corresponding to this residual magnetization flows across the magnetic gap including the fluid conduit 1.

The symbol $H_c$ in FIG. 4 designates the coersive force having a numerical value peculiar to the material of the core 10. Similarly, the positions $P_1$ and $P_1'$, where the magnetic energy product (B×H) is maximum, are determined by the material of the core 10. The straight line 3b represents the operating line when the pulse current is supplied to the coil 5 to generate the magnetic field $H_3$. Then, when the supply of the pulse current is interrupted, the straight line 3b shifts to the straight line 3a representing the operating line where no pulse current is supplied, and the operating point in this case is given by a point B where the straight line 3a intersects the loop of the B-H curve. Thus, a magnetic flux corresponding to the residual magnetization $+B_{r3}$ at this intersection B flows across the magnetic gap including the fluid conduit 1. These operating points A and B are relatively remote from the respective positions $P_1$ and $P_1'$ where the magnetic energy product is maximum. Therefore, in order to shift these operating points A and B (on the straight line 3a representing the operating line where no pulse current is supplied to the coil 5) to the respective positions $P_1$ and $P_1'$ where the magnetic energy product is maximum, the axial length ln of the core 10 should be increased so that the straight line 2a passing through the points $P_1$ and $P_1'$ acts now as the operating line. In such a case, the second yokes 11 and 12 are slid in their axial direction in FIG. 2 until the end faces of the core 10 make intimate face-to-face contact with the associated circular end faces of the second yokes 11 and 12 respectively.

In order to set the operating line at the desired gradient, the axial length ln of the core 10 must be suitably changed. The required value of the axial length ln of the core 10 is calculated on the basis of the factors including the diameter of the fluid conduit 1 in the magnetic gap and the sectional area of the core 10 in a direction orthogonal with respect to the magnetic circuit. However, the required axial length ln of the core 10 can be calculated according to a wellknown method commonly used for calculating magnetic characteristics of magnetic circuits, and the manner of calculation need not be described in detail herein.

When a straight line 1a represents the operating line when no pulse current is supplied to the coil 5, a point $P_2$ or $P_2'$ in FIG. 4 provides the operating point. In order to shift the point $P_2$ or $P_2'$ to the point $P_1$ or $P_2'$ where the magnetic energy product is maximum, the axial length ln of the core 10 is decreased to decrease the gradient of the operating line, so that the straight line 2a provides now a new operating line. In this case too, the positions of the second yokes 11 and 12 are adjusted to suit the changed length ln of the core 10 until their axially inner end faces make intimate face-to-face contact with the respective end faces of the core 10.

The materials of the first yokes 7, 8, core 10 and second yokes 11, 12 are preferably as follows:

First yokes may be made of SUS430, pure iron, mixture of powders of SUS430 and pure iron bound by a plastic material, Mn-Zn ferrite, Ni-Zn ferrite, silicon steel Second yokes may be made of Mn-Zn ferrite, Ni-Zn ferrite, mixture of powders of materials of first yokes (SUS430, pure iron, etc.) bound by a plastic material Core may be made of Carbon steel, Fe-Cu alloy, Nb-Ni-Co-Fe alloy, Cr-Co-Fe alloy, Co-Pd-Fe alloy According to the present invention, the second yokes 11 and 12 are made of a magnetic material having a low electrical conductivity. Therefore, an eddy current induced in the second yokes 11 and 12 during the magnetization of the core 10 by the pulse current supplied to the coil 5 can be suppressed to a minimum. As a result, the core 10 can be magnetized in a very short period of time as soon as the pulse current is supplied to the coil 5, and the power consumed for generating the pulse current can be correspondingly reduced.

Further, by merely adjusting the axial length ln of the core 10 and the axial positions of the second yokes 11 and 12, the operating point of the magnetic circuit can be shifted to the position where the magnetic energy product is maximum. Therefore, the efficiency of magnetic flux generation relative to the supplied energy can be easily maximized.

Figure 5:
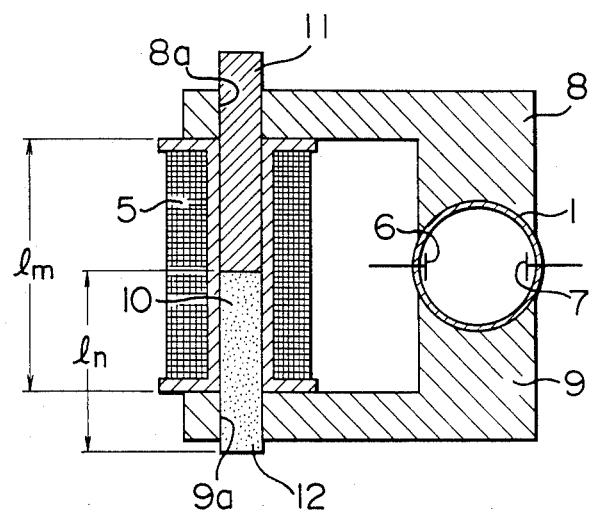
FIG. 5 shows schematically the structure of another embodiment of the present invention.

Referring to FIG. 5 a second embodiment of the present invention is shown. As is apparent from the comparison of the embodiments of FIGS. 2 and 5, the core 10 is disposed the position lower than that of FIG. 2 and a single second yoke 11 is disposed at the upper position. Namely, the embodiment of FIG. 5 is different from that of FIG. 2 only in the amount of insertion of the core 10. Even by the embodiment of FIG. 5, the above-mentioned position of the operation point can be set to a target position. According to the second embodiment, it is sufficient to provide only a single second yoke and there is no necessity of adjusting the length of core by cutting and/or polishing. Therefore, the second embodiment is preferable in a commercial point.

What is claimed is:

1. A magnetic field generating device for an electromagnetic flowmeter of residual magnetization type comprising: a pair of first yokes having one of their end faces disposed opposite to each other on both sides of a magnetic gap including a fluid conduit made of a non-magnetic material, a core disposed between the other end faces of said first yokes, a coil wound around said core, and at least one second yoke disposed so as to make direct contact with at least one of said first yokes and to make direct contact with the associated end face of said core, said second yoke being made of a magnetic material having a low electrical conductivity and a high permeability, said core having an axial length shorter than that of said coil.

2. A magnetic field generating device as claimed in claim 1, including a pair of second yokes, said core being disposed between said second yokes.

3. A magnetic field generating device as claimed in claim 2, wherein a magnetic circuit for a magnetic flux generated by said coil is composed of said core, one of said second yokes, one of said first yokes, the other of said first yokes, the other of said second yokes.

4. A magnetic field generating device as claimed in claim 1, wherein said second yoke is a single yoke, and a magnetic circuit for a magnetic flux generated by said coil is composed by said core, said second yoke, one of said first yokes, the other of said first yokes.

* * * * *